US006577432B2

(12) United States Patent
Engler et al.

(10) Patent No.: US 6,577,432 B2
(45) Date of Patent: Jun. 10, 2003

(54) POST AND POCKET MICROSTRUCTURES CONTAINING MOVEABLE PARTICLES HAVING OPTICAL EFFECTS

(75) Inventors: David A. Engler, St. Paul, MN (US); Rolf W. Biernath, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 44 days.

(21) Appl. No.: 09/805,952

(22) Filed: Mar. 14, 2001

(65) Prior Publication Data

US 2002/0131150 A1 Sep. 19, 2002

(51) Int. Cl.[7] .................... G02B 26/00; G09G 3/34
(52) U.S. Cl. .................... 359/296; 345/84; 345/107
(58) Field of Search .................... 359/296; 345/85, 345/84, 111, 108, 105, 107; 204/450, 478, 485, 490, 600, 606; 430/19, 35, 38, 60

(56) References Cited

U.S. PATENT DOCUMENTS

| 3,612,758 A | 10/1971 | Evans et al. ............... 348/803 |
| 4,126,854 A | 11/1978 | Sheridon .................... 345/107 |
| 4,261,653 A | 4/1981 | Goodrich .................... 359/296 |
| 4,290,174 A | 9/1981 | Kalleberg .................... 24/444 |
| 4,438,160 A | 3/1984 | Ishikawa et al. ............ 427/214 |
| 5,077,870 A | 1/1992 | Melbye et al. ............... 24/452 |
| 5,201,101 A | 4/1993 | Rouser et al. ............ 24/586.11 |
| 5,262,098 A | 11/1993 | Crowley et al. ............. 264/8 |
| 5,344,594 A | 9/1994 | Sheridon .................... 264/4.1 |
| 5,389,945 A | 2/1995 | Sheridon .................... 345/85 |
| 5,737,115 A | 4/1998 | Mackinlay et al. ......... 359/296 |
| 5,751,268 A | 5/1998 | Sheridon .................... 345/107 |
| 5,760,761 A | 6/1998 | Sheridon .................... 345/107 |
| 5,777,782 A | 7/1998 | Sheridon .................... 359/296 |
| 5,815,306 A | 9/1998 | Sheridon et al. ........... 359/296 |
| 5,825,529 A | 10/1998 | Crowley .................... 359/296 |
| 5,982,346 A * | 11/1999 | Sheridon et al. ............. 345/85 |
| 6,055,091 A | 4/2000 | Sheridon et al. ........... 359/296 |
| 6,128,124 A * | 10/2000 | Silverman .................... 359/296 |
| 6,222,513 B1 * | 4/2001 | Howard et al. ............... 345/84 |
| 6,392,786 B1 * | 5/2002 | Albert ........................ 359/296 |
| 6,396,621 B1 * | 5/2002 | Sheridon .................... 359/296 |
| 6,462,859 B1 * | 10/2002 | Bastiaens et al. ........... 359/296 |

FOREIGN PATENT DOCUMENTS

| EP | 0 902 410 A2 | 9/1998 | ............. G09F/9/37 |
| EP | 0 935 230 A2 | 5/1999 | ............. G09F/9/37 |

* cited by examiner

*Primary Examiner*—Georgia Epps
*Assistant Examiner*—Gary O'Neill
(74) *Attorney, Agent, or Firm*—Stephen W. Buckingham

(57) ABSTRACT

A microfabricated structure to interact with electromagnetic waves, such as a visual display apparatus for positioning movable particles, the structure comprising a substrate containing a plurality of pockets and/or a plurality of posts, and a plurality of optically anisotropic particles placed in the substrate. Pockets are sealable in relation to other pockets and to air, and each pocket being capable of positioning at least one particle.

40 Claims, 8 Drawing Sheets

POST AND POCKET MICROSTRUCTURES CONTAINING MOVEABLE PARTICLES HAVING OPTICAL EFFECTS

CROSS-REFERENCE TO RELATED APPLICATIONS

None.

BACKGROUND OF THE INVENTION

The present invention relates to microfabricated structures to interact with electromagnetic waves and, more particularly, to such structures containing pockets and posts for positioning optically anisotropic particles (e.g., rotary balls). Still more particularly, the invention is drawn to addressable, reusable visual displays which may be paper-like, such as "gyricon" or twisting-particle displays.

For purpose of illustration, the present application uses structures of gyricon displays to demonstrate the concepts and the benefits of the inventive structure.

A gyricon display, also called a twisting-particle display, rotary ball display, particle display, dipolar particle light valve, etc., offers a technology for making a form of electric paper and other reflective displays. Briefly, a gyricon display is an addressable display made up of a multiplicity of optically anisotropic particles, with each particle being selectively rotatable to present a desired face to an observer. The rotary particle can be of various shapes, such as spherical or cylindrical. For convenience, balls, rather than cylinders, are used in this description for illustrations. Like ordinary paper, electric paper preferably can be written on and erased, can be read in ambient light, and can retain imposed information in the absence of an electric field or other external retaining force. Also like ordinary paper, electric paper preferably can be made in the form of a lightweight, flexible, durable sheet that can be folded or rolled into tubular form about any axis and can be conveniently placed into a shirt or coat pocket and then later retrieved, restraightened, and read substantially without loss of information. Yet unlike ordinary paper, electric paper preferably can be used to display full-motion and changing images as well as still images and text. Thus, it is particularly useful for bistable displays where real-time imagery is not essential, but also adaptable for use in real-time imaging such as a computer display screen or a television.

A gyricon display, also called a twisting-particle display, rotary ball display, particle display, dipolar particle light valve, etc., offers a technology for making a form of electric paper and other reflective displays. Briefly, a gyricon display is an addressable display made up of a multiplicity of optically anisotropic particles, with each particle being selectively rotatable to present a desired face to an observer. The rotary particle can be of various shapes, such as spherical or cylindrical. For convenience, balls, rather than cylinders, are used in this description for illustrations.

In the prior art, the black-and-white balls (particles) are embedded in a sheet of optically transparent material, such as an elastomer sheet. The elastomer sheet is then cured. After curing, the elastomer sheet is placed in a plasticizer liquid, such as a dielectric fluid. The dielectric plasticizer swells the elastomer sheet containing the particles creating cavities larger than the particles around the particles. The cavities are also filled with the absorbed dielectric fluid. The fluid-filled cavities accommodate the particles, one particle per cavity, so as to prevent the particles from migrating within the sheet.

Besides being optically anisotropic, the particles are electrically dipolar in the presence of the fluid. This may be accomplished by simply including in one or both hemispheres materials that impart an electrical anisotropy, or by coating one or both sides of hemispheres with materials that impart electrical anisotropy. The above charge activation agents may impart an electrical anisotropy and an optical anisotropy at the same time. For example, when each hemisphere of a gyricon particle is coated with a material of a distinct electrical characteristic (e.g., Zeta potential with respect to a dielectric fluid) corresponding to a distinct optical characteristic the particles will have an electrical anisotropy in addition to their optical anisotropy when dispersed in a dielectric liquid. It is so because when dispersed in a dielectric liquid the particles acquire an electric charge related to the Zeta potential of their surface coating.

An optically anisotropic particle can be selectively rotated within its respective fluid-filled cavity, for example by application of an electric field, so as to present either its black or white hemisphere to an observer viewing the surface of the sheet. Under the action of an addressing electric field, such as provided by a conventional matrix addressing scheme, selected ones of the optically and electrically anisotropic particles are made to rotate or otherwise shift their orientation within their cavities to provide a display by the selective absorption and reflection of ambient light. In the case of balls with black and white hemispheres, for example, an image is formed by the pattern collectively created by each individual black and white hemisphere. Thus, by the application of an electric field addressable in two dimensions (as by a matrix addressing scheme), the black and white sides of the particles can be caused to appear as the image elements (e.g., pixels or subpixels) of a displayed image. Since the particles need only rotate, not translate, to provide an image, much faster imaging response is achieved than with the display of U.S. Pat. No. 3,612,758.

Normally, the particles are kept from rotating freely by a certain degree of frictional adhesion to the cavities. When the electric field is applied to the sheet, the adhesion of each particle to the cavity is overcome and the particles are rotated to point either their black or white hemispheres towards the transparent surface. Even after the electric field is removed, the structure (i.e., particles arranged in a specific pattern of orientations) will stay in position and thus create a bistable display until the particles are dislodged by another electric field. These bistable displays are particularly useful for remotely addressable displays that require little power to switch and no power to maintain display image for a long period of time (e.g., months).

Gyricon display technology is described further in U.S. Pat. No. 4,126,854 (Sheridon, "Twisting Ball Panel Display") and U.S. Pat. No. 5,389,945 (Sheridon, "Writing System Including Paper-Like Digitally Addressed Media and Addressing Device Therefor"). Further advances in black and white gyricon displays have been described in U.S. Pat. No. 6,055,091 (Sheridon, "Twisting-Cylinder Display"). The above-identified patents are all hereby incorporated by reference. The Sheridon patent disclosed a gyricon display which uses substantially cylindrical bichromal particles rotatably disposed in a substrate. The twisting cylinder display has certain advantages over the rotating ball gyricon because the elements can achieve a much higher packing density. The higher packing density leads to improvements in the brightness of the twisting cylinder display as compared to the rotating ball gyricon.

Gyricon displays are not limited to black and white images, as gyricon and other display mediums are known in the art to have incorporated color. Gyricons incorporating color have been described in U.S. Pat. No. 5,760,761 titled "Highlight Color Twisting Ball Display", U.S. Pat. No. 5,751,268 titled "Pseudo-Four Color Twisting Ball Display", U.S. patent application Ser. No. 08/572,820 titled "Additive Color Transmissive Twisting Ball Display", U.S. patent application Ser. No. 08/572,780 titled "Subtractive Color Twisting Ball Display", U.S. Pat. No. 5,737,115 titled "Additive Color Tristate Light Valve Twisting Ball Display", U.S. Pat. No. 6,128,124 titled "Additive Color Electric Paper Without Registration or Alignment of Individual Elements" and European Patent No. EP0902410 titled "Methods for Making Spinnable Ball, Display Medium and Display Device". The above-identified patents are all hereby incorporated by reference.

The above prior art all involve a process which is to randomly pack the bichromal particles in an elastomeric matrix, cure the elastomer, and subsequently swell the elastomer in the dielectric oil. The process is laborious and time-consuming, consisting of mixing of the particles into the elastomer, coating the slurry into a sheet format, curing, and subsequently swelling the sheet with the dielectric oil.

Furthermore, the display device of such an arrangement poses problems in connection with the selection of a usable dielectric liquid, stability upon changes in temperature, non-uniformity of dimensions of the cavities, and the like. The material considerations in the prior art are many, the primary issues being tuning the swelling of the elastomer by the dielectric oil without harming the dielectric oil compatibility with all the other elements of the display package.

Furthermore, the above approach resulted in less than satisfactory contrast of the display, associated with the relatively low reflectance of a gyricon display. It is commonly believed that the best way to improve the reflectance of a gyricon display is to make the display from a close packed arrangement of bichromal particles. The closer packed the arrangement of particles, the better the reflectance and the brighter the appearance of the display. To achieve a close packed arrangement, the cavities in which the particles rotate should be close to each other and each cavity should have little unfilled space when filled with a particle, ideally no more empty space than what is necessary to keep the particle therein rotatable. The prior art approaches, however, had difficulties to achieve a high density of particles, mainly due to the lack of controlling on the formation of individual cavities. The result is typically that cavities are either too large, or distributed too loosely in the elastomer with large distances and thick walls between the individual cavities, making it difficult to control the arrangement and packing density of the display particle members to a sufficiently high value to achieve a display of high quality, high resolution, and high contrast.

As a related problem, in a typical conventional gyricon display, bichromal particles are dispersed throughout the thickness of the substrate sheet, which is always thicker than two particle diameters and is usually many diameters thick. Generally, less than 20 percent of the upper surface area of the sheet is covered by the bichromal particles in the layer closest to the surface. Therefore, a display according to the above prior art has multiple layers of particles instead of a single layer, making the display thick and bulky, an undesirable feature especially for an electronic paper. In the prior art designs, the multiple layer configuration is on one hand necessary in order to increase the reflectance (the reflectance of multiple layers of loosely packed particles accumulatively approaches that of a closely packed single layer) and on the other hand difficult to avoid due to the characteristics of the prior art process of making a display.

To achieve higher packing density, the above method was modified in U.S. Pat. No. 4,438,160 to Ishikawa et al, which patent is incorporated by reference. In the Ishikawa patent, instead of using the swelling method to create cavities larger than the particles, the particles are coated with a layer of wax before being placed in the elastomer. The wax is later melted away, resulting in cavities that are larger than the particles. Presumably, because it is easier to control the thickness of the wax layer coated on the particles than to control the degree of swelling the elastomer, it is also easier to achieve higher density of particles by using the Ishikawa method. The actual improvement, however, is not significant enough to solve the problem. See U.S. Pat. No. 5,825,529 to Crowley, which patent is incorporated by reference.

To achieve still higher packing density, a gyricon display can be constructed without elastomer and without cavities. U.S. Pat. No. 5,825,529 to Crowley, for example, uses no elastomer substrate. In the display in the Crowley patent, the bichromal particles are placed directly in the dielectric fluid. The particles and the dielectric fluid are then sandwiched between two retaining members (e.g., between the addressing electrodes). There is no elastomer substrate. Electrodes serve both to address particles and to retain particles and fluid in place. Particles and fluid can be sealed in the display by seals at either end of the display. In addition, the spacing between electrodes is set to be as close to the diameter of particles as is possible consistent with proper particle rotation, resulting a monolayer display. The Crowley patent achieved a display with a closely packed monolayer having a light reflectance that surpasses that of the multi-layer displays in the prior art.

The display in the Crowley patent, however, has two potential problems. First, the display package is environmentally and mechanically sealed only around the perimeter of the display. This results in the package being susceptible to cracking as may result from wear and tear; in this instance, a single crack would be adequate to enable all of the dielectric oil to drain or evaporate away, thereby disabling the function of the display. Additionally, the package is susceptible to buckling, and the elastomer-particle film can sag or slide out of position because of gravity (especially when held vertically for long periods of time, such as for display signs). This is because the mechanical support for the package is primarily the thin polymer films on the front and back sides, and because the reinforcement of these films occurs only where they are bonded together along the periphery.

BRIEF SUMMARY OF THE INVENTION

The invention described herein circumvents all of the above-identified concerns existing in the prior art. As compared to random-packed particles in an elastomer matrix, the invention uses no elastomer matrix. The invention uses pre-formed pockets and/or posts to organize particles in a monolayer close packed array. The post and pocket film structure eliminates need for elastomer, thus eliminates the slowest process steps (curing elastomer and swelling elastomer with dielectric oil). As compared to the Crowley patent, the particles in the present invention are supported by posts and/or pockets and further sealed separately in individual pockets. Furthermore, where an electrode plate or a cover film is used, such as in an addressable gyricon visual display, the electrode plate or a cover film may be supported by the ends of posts and/or the sidewalls of pockets to strengthen the structure.

BRIEF DESCRIPTION OF THE DRAWINGS

The present invention will be further explained with reference to the drawing figures listed below, wherein like structure is referred to by like numerals throughout the several views.

While the above-identified drawing figures set forth several preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention.

DETAILED DESCRIPTION

Figure 1:
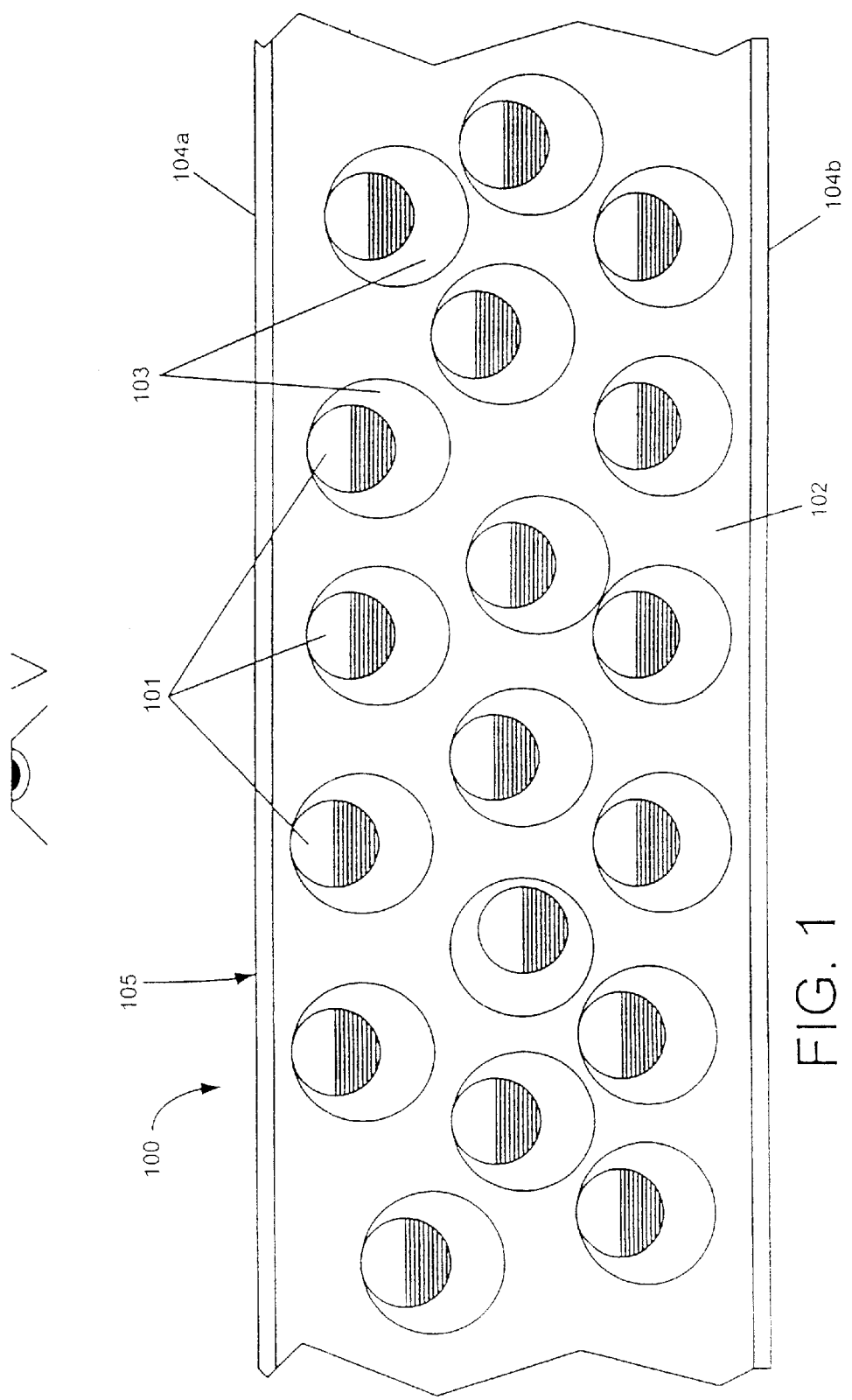
FIG. 1 is a partial side sectional view of a multilayer black and white gyricon display of the prior art.

An exemplary prior art gyricon display 100 is shown in FIG. 1 (PRIOR ART). Bichromal balls (particles) 101 are disposed in an elastomer substrate 102 that is swelled by a dielectric fluid (not shown) creating cavities 103 in which balls 101 are free to rotate. The balls 101 are electrically dipolar in the presence of the fluid and so are subject to rotation upon application of an electric field, as by matrix-addressable electrodes 104a, 104b. The electrode 104a closest to upper surface 105 is transparent. A viewer at V sees an image formed by the black and white pattern of the balls 101 as rotated to expose their black or white faces (hemispheres) to the upper surface 105 of substrate 102.

Figure 2:
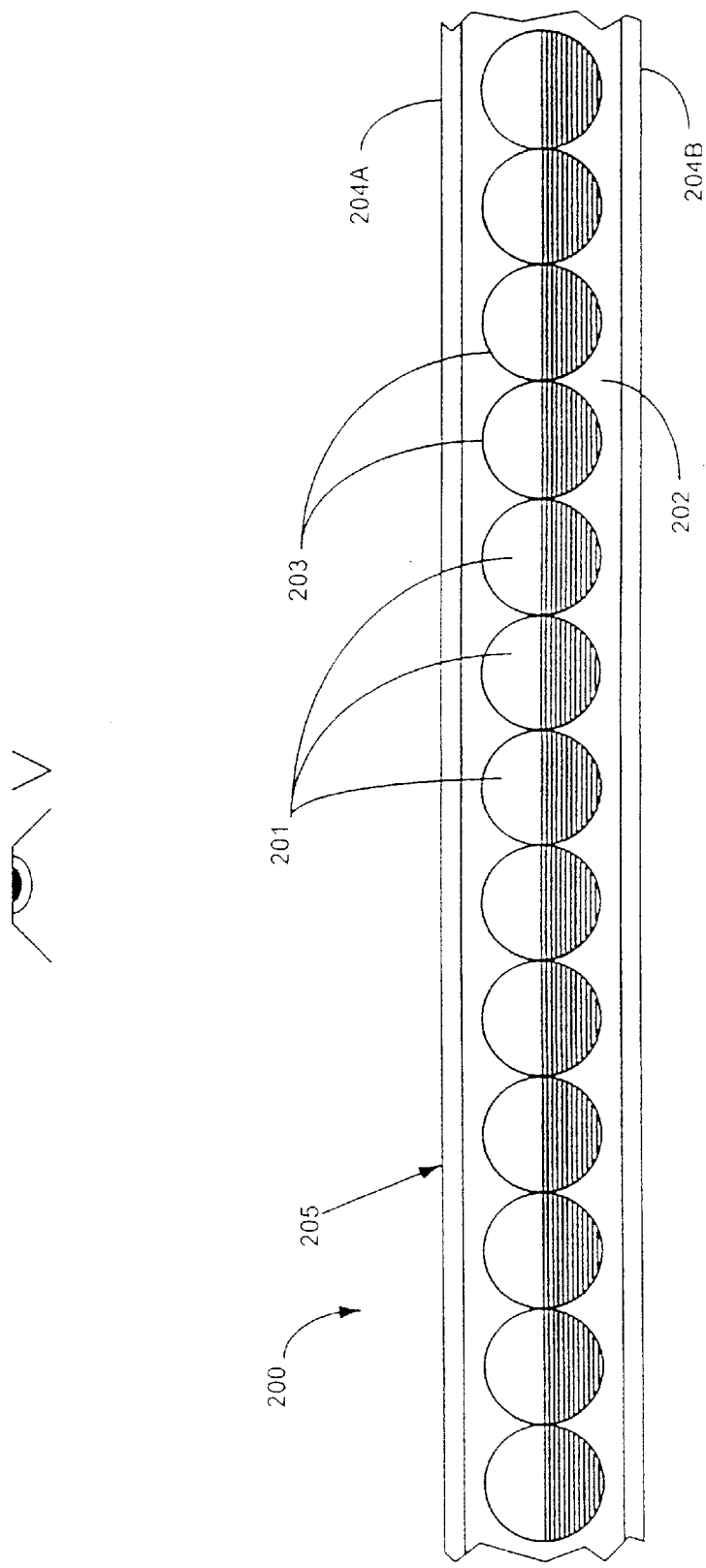
FIG. 2 is a partial side sectional view of a monolayer black and white gyricon display of the prior art.

Another exemplary prior art gyricon display 200 is shown in FIG. 2 (PRIOR ART). Bichromal balls 201 are placed close to one another in a monolayer in dielectric fluid 202 between addressable electrodes 204a, 204b. No elastomer substrate is used.

As shown in FIG. 1 and FIG. 2, the prior art gyricon displays either use an elastomer matrix comprising an elastomer substrate 102 and randomly packed particles 101 (FIG. 1) or uses no sealing and supporting structure in the middle of the display 200 at all (FIG. 2). Compared to the prior art, the present invention uses no elastomer matrix, but has a pre-formed sealing and supporting structure comprising pockets and/or posts in the middle of the gyricon display.

Preferred Embodiments

Figure 3A:
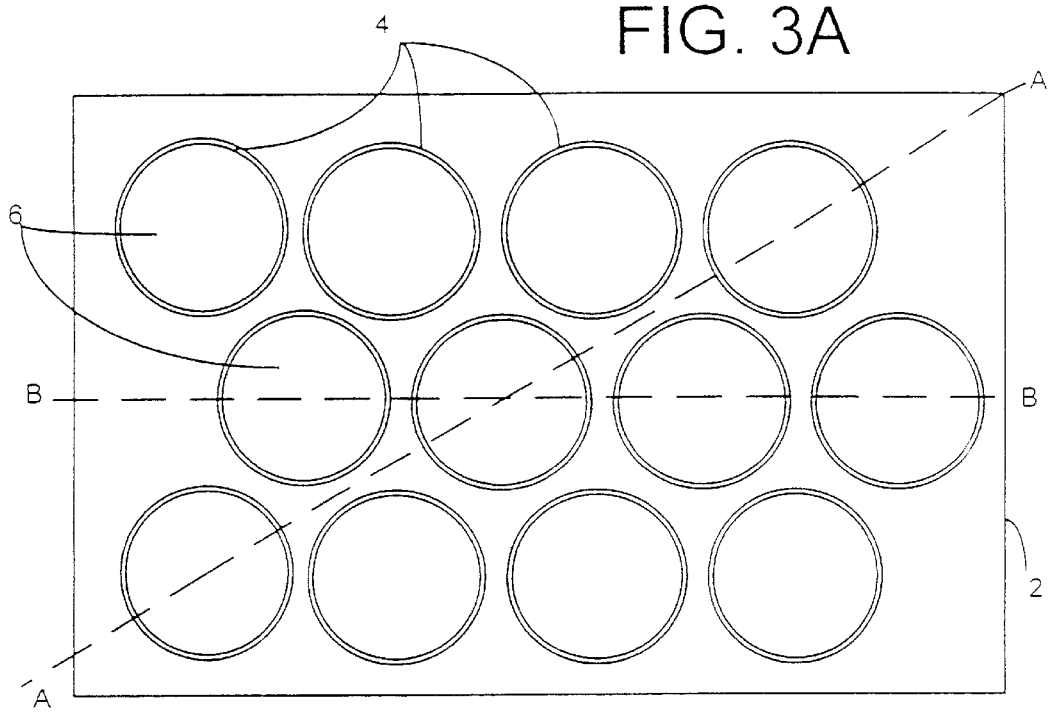
FIG. 3A is a top view of a gyricon display of the present invention that uses pockets only but no posts.
Figure 3B:
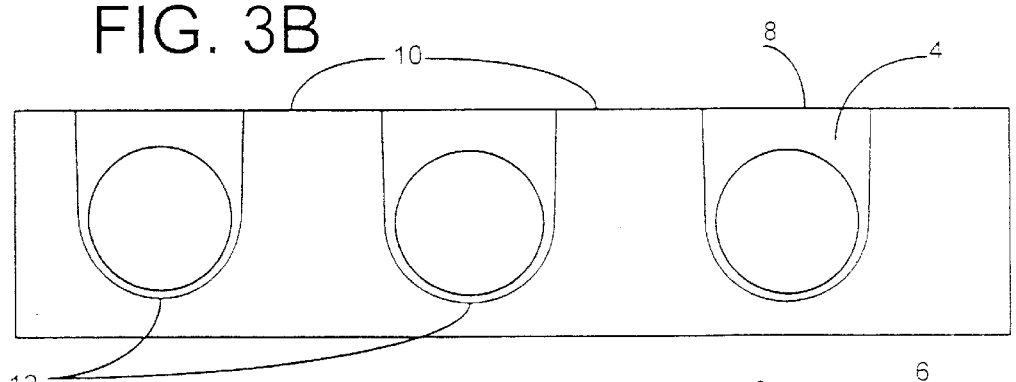
FIG. 3B is a cross-section along slice A—A in FIG. 3A.
Figure 3C:
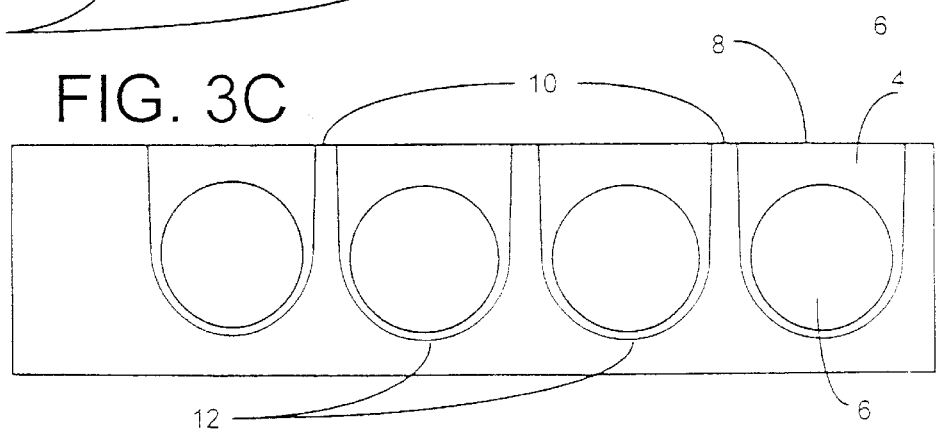
FIG. 3C is a cross-section along slice B—B in FIG. 3A.

In one preferred embodiment shown in FIGS. 3A–3C, only pockets 4 are used. FIG. 3A is a top view of a gyricon display 2 of the present invention that uses pockets 4 only but no posts. In the instant case particles are spheroidal beads 6, with one bead 6 being positioned within each pocket 4 and each pocket 4 providing oil-sealing electrical isolation of each individual bead 6. Multiple particles 6, however, can be contained in each pocket 4. Because of the manufacturing process, gyricon beads 6 may vary slightly in diameter over a distribution, such as from 90% to 110% of a median bead diameter. Accordingly, the pockets 4 are preferably sized to receive the largest size bead 6 in the distribution, such as 115% of the median bead diameter.

Since each pocket 4 can be a sealed structure itself, pockets 4 provide localized encapsulation of dielectric oil (not shown). A sealing film 8 is applied over the top and seals to the tops of the pocket sidewalls 10. This feature prevents a single crack in the display from causing a catastrophic loss of dielectric oil (not shown) throughout the display 2. It also results in scissor-cuttable displays 2 to size with no need for subsequent sealing operations.

As best shown in FIG. 3B, it is preferable to have rounded bottoms 12 to the pockets 4 in order to allow surface tension and frictional effects to stabilize the beads 6 at the bottoms of the pockets 4. The surface tension and friction prevent the beads 6 from wobbling about in the pockets 4, thereby ensuring long-term image stability. At the present time, it is not understood how much surface contact is needed to keep the beads 6 from wobbling, and it may turn out that flat bottoms are sufficient and rounded bottoms 12 are not necessary. Regardless of which is needed for ensuring image stability, rounded or tapered bottoms will aid in manufacturability of the substrate. Particularly, in a molding method used to make the pockets 4 (described later in this application, with reference to FIG. 6), smooth rounded bottoms 12 without abrupt changes at the corners may lead to less frequent clogs during the process and easier separation of the product substrate containing pockets 4 (and/or posts) from the mold 156.

In the embodiment of FIGS. 3A–3C, the image density (or saturation) is somewhat compromised. In the case where each pocket is sized to contain only one particle, for example, the sidewalls 10 of the pockets 4 reduce the image density by approximately 20% of that which would be achieved by hexagonal close packing of the beads 6.

Figure 4A:
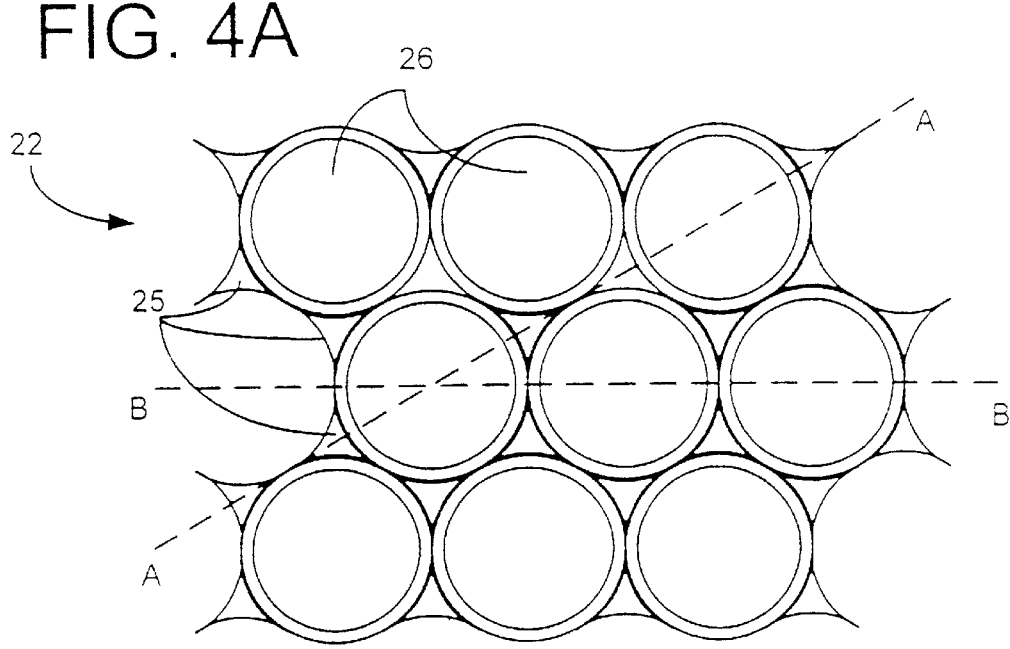
FIG. 4A is a top view of a gyricon display of the present invention that uses posts only but no pockets.
Figure 4B:
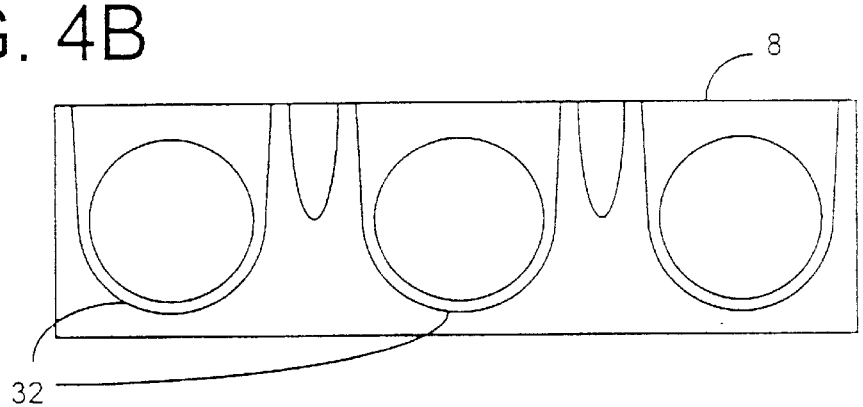
FIG. 4B is a cross-section along slice A—A in FIG. 4A.
Figure 4C:
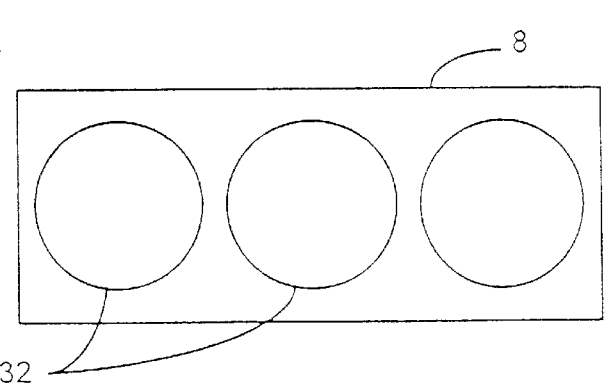
FIG. 4C is a cross-section along slice B—B in FIG. 4A.

In another preferred embodiment shown in FIGS. 4A–4C, only posts 25 are used but no pockets. In the post-only display 22, pre-formed posts 25 prevent random positioning of the particles 6 and help to tightly pack the particles 6, providing the benefit of maximal image density. The posts allow particle packing density equal or close to that shown in FIG. 2, in the case where particles are dispersed in a monolayer. In addition, this structure also supports the particles 6 when the display is held in a vertical position.

Where the particles 6 are spheroidal beads, the preferred design of the posts 25 is a convex, rounded triangular structure. The triangular shape most naturally fits the space between the beads 6 in a hexagonal close packed array 22. The convex shape serves to provide some of the cupping action believed helpful to prevent the beads 6 from wobbling about or rotating in the absence of an intentionally applied field. Additionally, the rounded edges prevent defects in the beads 6 from accidentally wedging into the narrow space between the posts. It may prove in the future that posts with rounded edges, even if not in the particular triangle structure as shown, are adequate.

Line 8 at top of cross-sections represents the sealing film and electrode film. Again, rounded bottoms 32 are believed helpful both to product performance and to manufacturability, but their necessity is unproven.

The compromise of the above embodiment of FIGS. 4A–4C is that the fluid isolation, which is achieved by the pockets 4 in FIGS. 3A–3C, is lost. It is, however, envisioned that this film structure 22 could be cut with a hot knife, whereby edge-sealing is accomplished while cutting. Additionally, the post-only display 22 would allow the oil (not shown) to be infiltrated from an open edge after all other fabrication steps have been accomplished, thereby preventing oil leakage from contaminating other manufacturing processes at the vendor's shop.

In yet another preferred embodiment shown in 5A–5E, both pockets and posts are used. A single hexagonal repeat cell 40 of a gyricon display 42 of the present invention uses both pockets 44 and posts 45. Each of the pockets 44 has a perimeter 43. While the particles 6 are packed and supported by posts 45, they are grouped using pockets 44. Each group of particles 6 within a pocket 44 form an independently sealed colony.

Figure 5A:
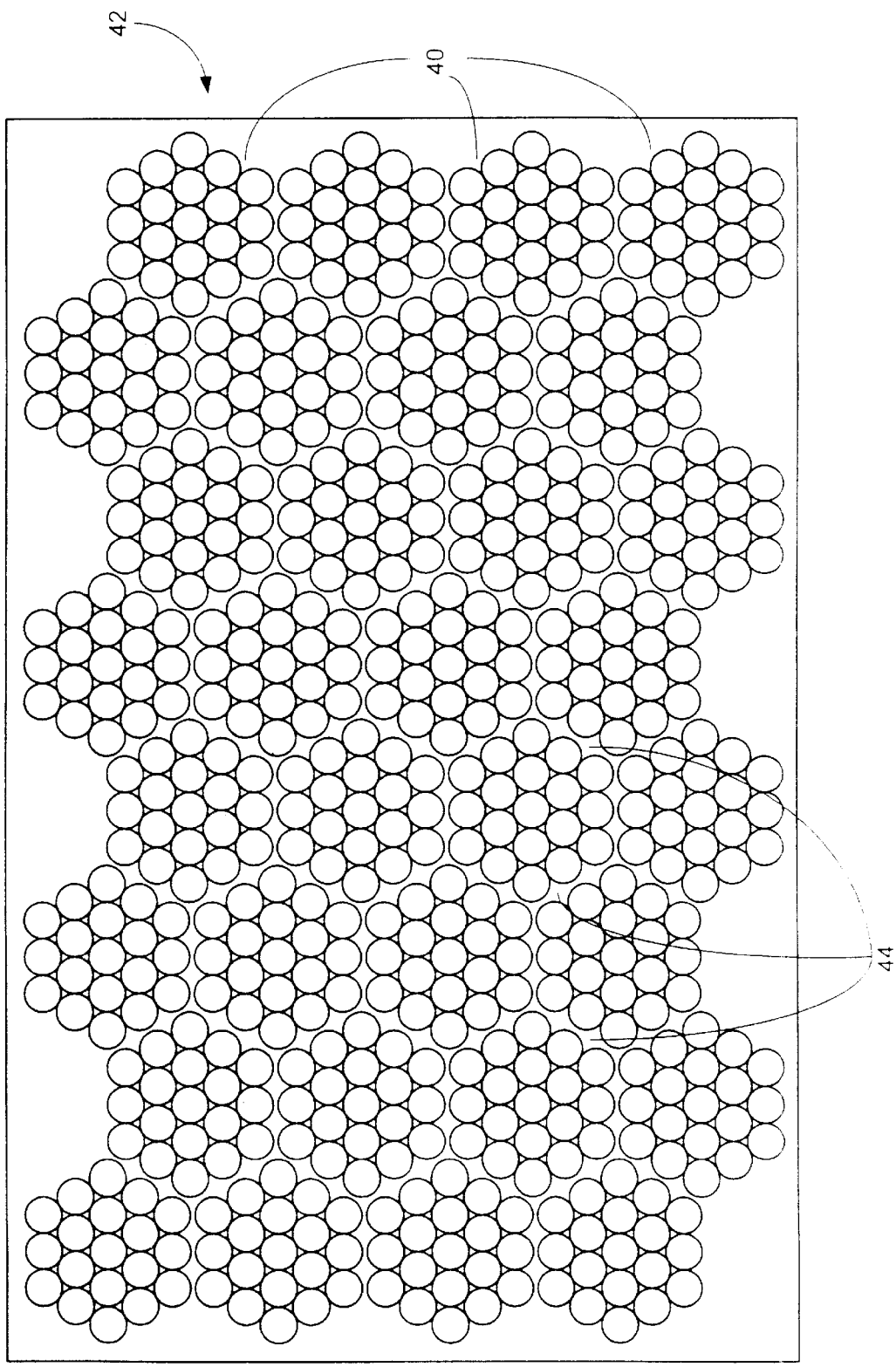
FIG. 5A is a top view of a gyricon display of the present invention in an embodiment employing both pockets and posts.
Figure 5B:
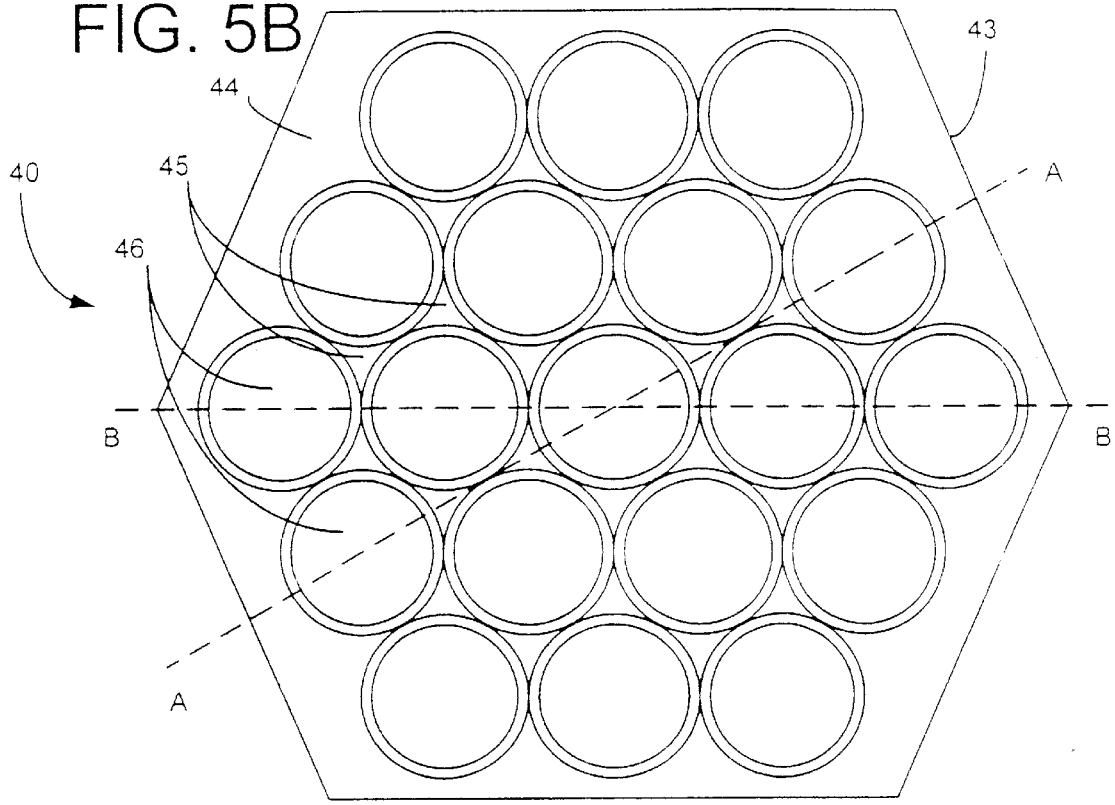
FIG. 5B is a top view of a single hexagonal repeat cell of a gyricon display of the present invention that uses both pockets and posts.
Figure 5C:
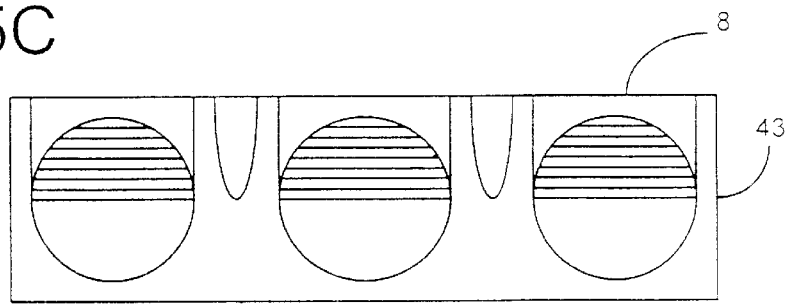
FIG. 5C is a cross-section along slice A—A in FIG. 5B.
Figure 5D:
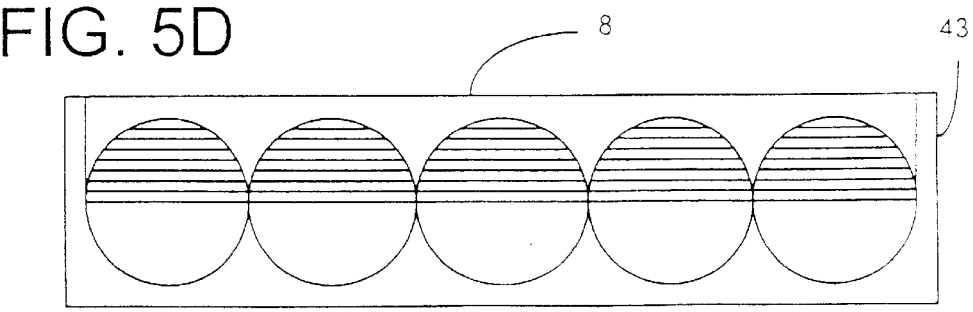
FIG. 5D is a cross-section along slice B—B in FIG. 5B.
Figure 5E:
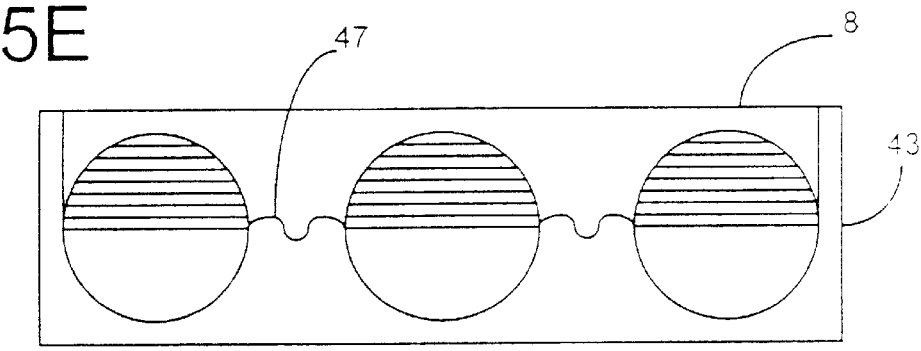
FIG. 5E is a cross-section along slice A—A in FIG. 5B in an alternative embodiment wherein the posts are short humps and do not reach the sealing film.

FIG. 5E is a cross-section along slice A—A in FIG. 5B in an alternative embodiment wherein the posts are short humps (or truncated posts) 47 and do not reach the sealing film 8. In this embodiment, the supporting and strengthening benefit comes mainly from the perimeter 43 of the pockets 44 but not from the post 47 which are shorter than full-length posts 45. However, since the gyricon display 42 usually has many pockets 44, the display 42 is still better supported and more rigid than the prior art structure 200 in the Crowley patent even without the support from short posts 47. In addition, short posts 47 do support the particles 6 positionally, helping to achieve a higher packing density and preventing the particles 6 from settling when the display 42 is held in a vertical position (e.g., when the display 42 is tilted on an edge). Furthermore, short posts 47 allow for a second layer of particles placed at interstices of the first layer and over the truncated posts. The short posts 47 may be short rounded humps 47 as shown in FIG. 5E but can also be truncated posts of other shapes. The advantage of using short humps 47 as compared to other types of posts such as the contoured triangular full-length posts 45 is that the short humps 47 are of a simpler shape and easier to make. Particularly, as described later in this application, in a molding method used to make the pockets and post structures, a rounded shape of humps 47 will tend to cause less difficulties in separating the mold 156 and product 162 at the end of the molding process.

The post and pocket microstructure of FIGS. 5A–5E offers a good compromise of features and benefits. Fluid isolation is achieved by pockets 44. Posts 45 or humps 47 within the pockets 44 serve to organize the particles 6 and prevent their clumping together.

One potential problem of the pocket and post structure is that when the pockets 44 are arranged in a regular pattern, the image density also varies in a regular pattern across the surface of the page, resulting in lines perceptible to human eyes. For example, when the basic cell 40 (a pocket with a plurality of posts and particles positioned wherein) is a hexagon, the lattice pattern would be perceptible to the observer. This phenomenon is illustrated in FIG. 5A which shows a plurality of cells 40 each comprising a pockets and a plurality of posts arranged in a hexagonal pattern. Workarounds for the above problems are well known, and include randomization of the cell shape (e.g., oblong, dog-leg, or size-variation) and randomization of the location and orientation of the various cells to one another (e.g., basket-weave, herring-bone, or cross-hatch). The key principle is to remove the straight lines which are so adeptly noted by the human eye.

In each of the above embodiments, when bistability of the display is important, it is advantageous to have certain degree of frictional adhesion between the particles 6 and the cavities in which the particles 6 are contained to prevent the particles 6 from rotating freely. Additionally, or alternatively, the top cover layer 8 may be made to contact with the particles 6 to either enhance or generate the desired bistability. The top cover layer 8 may be a UV curable transparent overcoat for the pockets sealing the particles in the pockets. Alternatively, a transparent filling material such as an elastomer (not shown) may be placed on top of and in contact with the particles 6 to either enhance or generate bistability. The transparent filling material may be positioned above the particles 6 but below the cover layer 8 and is in contact with the particles so that the particles are bistable. The filling material may be a solid material and further made integral with the cover layer, but it may also be a fluid added as or in addition to a dielectric fluid.

In addition, in each of the above embodiments, the pockets and/or posts form peripheral areas surrounding display particles 6. Careful engineering of the surface optical characteristics of the pockets and/or posts, such as color and reflection property, may help to enhance the displayed image saturation and contrast. Furthermore, optical elements may be combined with the pockets and/or posts for the same purpose. For example, the optical elements as disclosed in the commonly-owned U.S. patent applications titled "Microstructures with Assisting Optical Elements to Enhance an Optical Effect" and "Microstructures with Assisting Optical Lenses" and filed concurrently (Attorney Docket Numbers M507.12-16 and M507.12-17 respectively) may be used. The disclosures of the above-identified patent applications are hereby incorporated herein by reference.

Advantages resulting from this invention are several. First, as compared to the prior art (random-packed slurry-coated particles), the invention uses posts 45 (or humps 47 in FIG. 5E) to organize particles 6 in a close packed array (preferably hexagonal if the particles are balls, but other patterns may be used, particularly when particles are non-spheroidal, such as cylindrical). This results in higher contrast and controlled electrical interactions between particles 6. The close packing also results in a thinner display, allowing lower driving voltages to be employed.

Second, the invention preferably uses no elastomer matrix. The post and pocket film structure eliminates need for an elastomer matrix, thus eliminates the slowest manufacturing process steps (curing elastomer and swelling elastomer with dielectric oil). Significantly, this also enables a wider variety of dielectric oils to be used since there is no need to tune the degree of swelling of the elastomer by the dielectric oil without harming the dielectric oil compatibility with all the other elements of the display package. In addition, there is no need for users to handle the fragile swelled elastomer sheet.

Third, pockets 44 provide localized encapsulation of dielectric oil. This feature prevents a single crack in the display from causing a catastrophic loss of dielectric oil throughout the display. It also results in scissor-cuttable displays to size with no need for subsequent sealing operations.

Fourth, pockets 44 and/or posts 45 strengthen display 42. The posts and pockets serve as spacers and stiffening members for heat sealing. This also enables heat sealing of top ends of the pockets 44 or posts 45 to the electrode or sealing film 8 across the face of the display 42 to eliminate possibility of sagging or slumping.

Finally, in the pocket and post structure the cavities are open from the top during manufacturing. As a consequence, the dielectric fluid does not need to diffuse through an elastomer. This allows a much greater variety of dielectric fluids to be used than in the case for the swollen elastomer sheets. For example, a thixotropic dielectric fluid can be used, as can meltable fluids. A suitable example of the thixotropic fluids is Isopar G with a few percent of nanocomposite clay or fumed silica with the appropriate surface treatment. Another suitable thixotropic fluid is Isopar G with 5 to 10 percent petroleum jelly blended-in. Since the diffusional requirement has be eliminated by this invention, the broad range of science pertaining to viscosity-modifiers, thixotropy modifiers, and the like can be applied. Particularly, the thixotropic fluids may be designed such that the rotatable particles are not free to rotate until a certain voltage threshold is reached, hence achieving a controllable degree of bistability. Similarly, a thixotropic fluid may be used to render the particles rotatable only after subjecting the display to a vibrational energy source such as ultrasonic or mechanical. Likewise, a temperature sensitive fluid may be selected to render the particles rotatable only when the display is heated. Furthermore, besides the access to a broad range of dielectric fluids, a non-dielectric filling material, either solid material or a fluid, may be used in addition to or mixed with a dielectric fluid to achieve an even broader range of property adjustment. Furthermore, because the geometric shape and pattern of the pocket/post structure are controllable in manufacturing, the inventive structure can be adjusted if necessary according to the properties of the dielectric fluid or non-dielectric filling material to be added.

It is to be understood that although for the purpose of illustration the above embodiments all show a monolayer of particles, multiple layers may also be used in the structures in accordance with the invention. Particularly, where no posts or only truncated posts are used, a second layer of smaller particles may be placed at the interstices of the first layer to enhance the display quality.

Furthermore, it is to be understood that although for the purpose of illustration the above embodiments all use particles in spheric shape, the present invention is not limited to any particular type of gyricon particles. For example, the invention could be applied to gyricon display using particles that have geometric shapes other than spheric balls. Similarly, although black and white displays are illustrated in the embodiment, the present invention could also be applied to gyricon displays incorporating either bichromal color, trichromal color, or four quadrant colored balls.

Furthermore, the application of the present invention is not limited to gyricon displays using rotating particles. Other types of electronic displays containing either display particles or a liquid medium or both may also use the invention to improve encapsulation, sealing characteristics and the strength of the display. For example, the electrophoretic particle suspension displays based on electrophoresis may also benefit from the present invention if it is desirable to have better localized encapsulation and sealing or an overall stronger structure.

Furthermore, the microstructure according to the present invention may be used for purposes other than visual displays. For example, where gyricon particles having optical anisotropy pertaining to electromagnetic waves other than a visible light are used, the inventive microstructure may be used as a device for optical purposes other than visual displays. Examples for such applications include but are not limited to microwave reflectors and absorbers, IR reflectors and absorbers, and configurable radio wave antennas and reflectors.

Method of Manufacture

The methods of making the various types of gyricon particles are disclosed in numerous patents such as U.S. Pat. Nos. 4,261,653; 5,344,594; 5,737,115; 5,751,268; 5,760,761 and 6,055,091. These patents are hereby incorporated herein.

Figure 6:
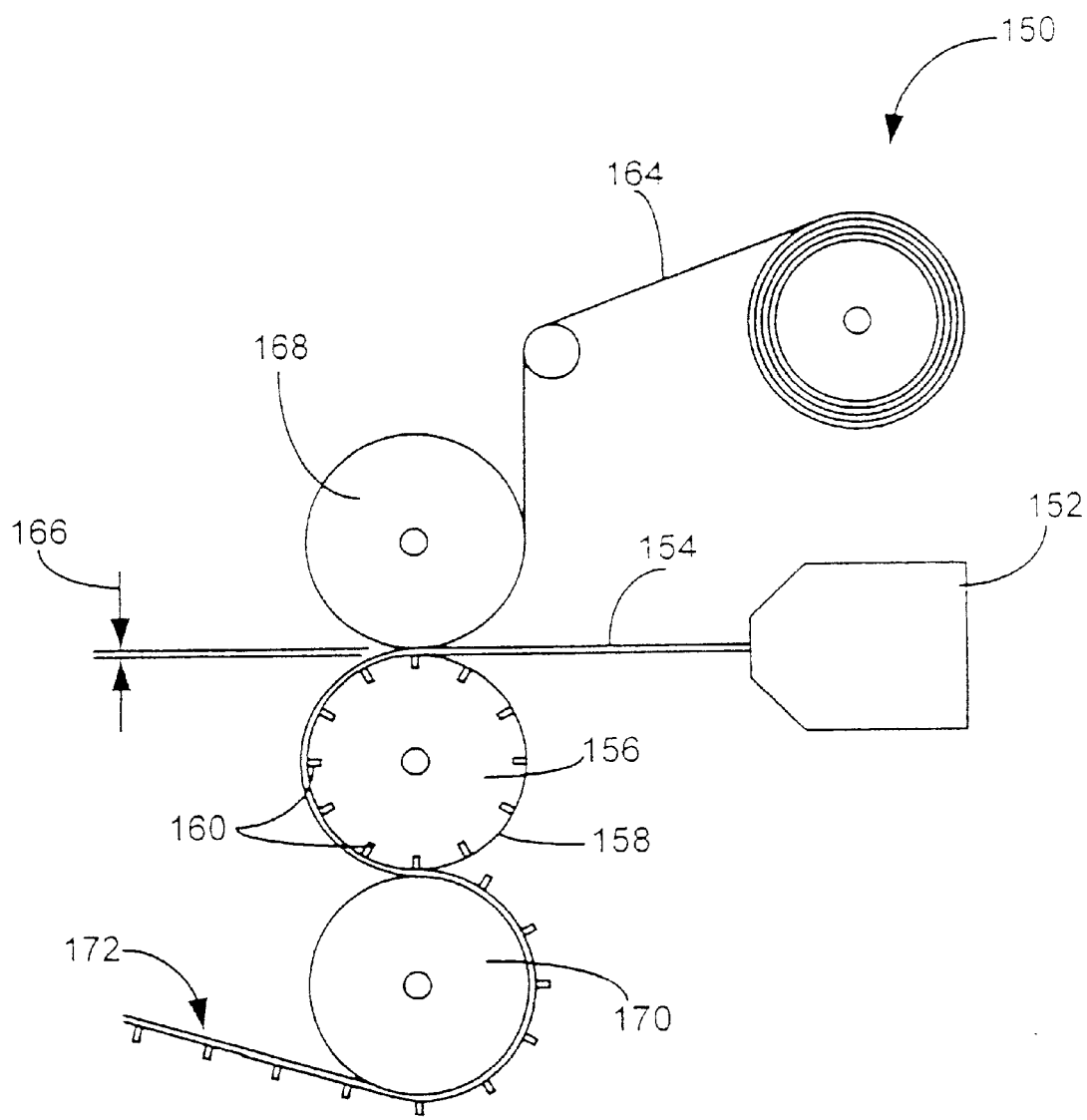
FIG. 6 is a schematic illustration of an exemplary method of manufacturing the microstructured substrate in accordance with the present invention.

The process illustrated in FIG. 6 shows a three-roll vertical stack molding apparatus 150 which includes an extruder and extrusion die 152 adapted for extruding one or more layers of molten thermoplastic material 154 into a mold 156. In this case, the mold 156 is a roll 158, which has on its outer cylindrical surface a desired surface pattern for transference to the molten thermoplastic material 154 as it passes over the cylindrical surface of the roll 158. In the illustrated embodiment, the surface of the roll 158 has a plurality of arranged cavities 160 adapted to form a like plurality of upstanding stems 162. The cavities may be arranged, sized and shaped as required to form a suitable surface stem structure from the thermoplastic material 154. In one embodiment, a sufficient additional quantity of molten thermoplastic material 154 is extruded into the mold 156 to form a portion of a backing layer or base portion (not shown).

The roll 158 is rotatable and forms a nip 166, along with an opposed roll 168. The nip 166 between the roll 158 and opposed roll 168 assists in forcing the flow of molten thermoplastic material 154 into the cavities 160 and provides a uniform backing layer thereon. The spacing of the gap forming the nip 166 can be adjusted to assist the formation of a predetermined thickness of the backing layer of thermoplastic material 154.

As illustrated in FIG. 6, the slip control article 172 may traverse a third roll 170 after exiting the roll 158. In this process, the temperatures of all three rolls 158, 168, 170 may be selectively controlled to achieve desired cooling of the thermoplastic material 154. The third roll 170 also serves to define the further path traversed by the slip control article 172.

The mold 158 may be of the type used for either continuous processing (such as a tape, a cylindrical drum or a belt), or batch processing (such as an injection mold or a compression mold). When making a mold 158 for forming the upstanding stems 162, the cavities 160 of the mold 158 maybe formed in any suitable manner, such as by drilling, machining, laser drilling, water jet machining, casting, etching, die punching, diamond turning, engraving, knurling and the like. The placement of the cavities 160 determines the spacing and orientation of the slip control article. The stems 162 typically have shapes corresponding to the shape of the cavities 160. The mold cavities 160 can be open at the end of the cavity opposite the surface from which the molten thermoplastic material is applied to facilitate injection of the thermoplastic material into the cavity 160. If the cavity 160 is closed, a vacuum can be applied to the cavity 160 so that the molten thermoplastic material fills substantially the entire cavity 160. Alternatively, closed cavities 160 can be longer than the lengths of the stem structures being formed so that the injected material can compress the air in the cavities 160. The mold cavities 160 should be designed to facilitate release of the surface stem structures therefrom, and thus may include angled side walls, or a release coating (such as a Teflon material layer) on the cavity walls. The surface of the mold 156 may also include a release coating thereon to facilitate release of the thermoplastic material backing layer from the mold. In some embodiments, the cavities 160 can be angled relative to the surface of the roll 158.

The mold 156 can be made from suitable materials that are rigid or flexible. The mold components can be made of metal, steel, ceramic, polymeric materials (including both thermosetting and thermoplastic polymers such as silicone rubber) or combinations thereof. The materials forming the mold 156 must have sufficient integrity and durability to withstand the thermal energy associated with the particular flowable thermoplastic material used to form the backing layer and surface topographies. In addition, the material forming the mold preferably allows the cavities 160 to be formed by various methods, is inexpensive, has a long service life, consistently produces material of acceptable quality, and allows for variations in processing parameters.

The molten thermoplastic material 154 is flowed into the mold cavity 160, and over the surface of the mold 156 to form the layer of cover material. To facilitate flow of the molten thermoplastic material, the thermoplastic material typically must be heated to an appropriate temperature, and then coated into the cavities. This coating technique can be any conventional technique, such as calendar coating, cast coating, curtain coating, die coating, extrusion, gravure coating, knife coating, spray coating or the like. In FIG. 6, a single extruder and extrusion die arrangement is shown. However, the use of two (or more) extruders and associated dies allows simultaneous extrusion into the nip 166 of a plurality of thermoplastic materials to achieve a multi-component (layered or blended) laminate cover material.

After the molten thermoplastic material 154 has been coated into the mold cavities 160 and over the mold surface 156, the thermoplastic material is cooled to solidify and form the desired exterior surface topography thereon (e.g., upstanding stems 162). The solidified thermoplastic material is then separated from the mold 158. The thermoplastic material 154 will often shrink when it is solidified, which facilitates release of the material (e.g., surface stem structures and backing layer) and integral film layer from the mold. Part or all of the mold 156 may be cooled to aid in solidifying the surface stem structures 162 and backing layer (not shown). Cooling can be effected by the use of water, forced air, heat transfer liquids or other cooling processes.

Some molding processes, such as injection molding, may utilize thermoset elastomeric polymers. When thermosetting resins are used as the molten material, the resin is applied to the mold as a liquid in an uncured or unpolymerized state. After the resin has been coated onto the mold, it is polymerized or cured until the resin is solid. Generally, the polymerization process involves either a setting time, or exposure to an energy source, or both, to facilitate the polymerization. The energy source, if provided, can be heat or radiation energy such as an electron beam, ultraviolet light or visible light. After the resin is solidified, it is removed from the mold. In some instances, it may be desired to further polymerize or cure the thermosetting resin after the surface stem structures are removed from the mold. Examples of suitable thermosetting resins include melamine, formaldehyde resins, acrylate resins, epoxy resins, urethane resins and the like. The formation of a backing layer having upstanding stem structures on at least one side thereof can be performed by injection molding or profile extrusion, such as is disclosed in U.S. Pat. No. 4,290,174 (Kalleberg); U.S. Pat. No. 5,077,870 (Melbye et al.); and U.S. Pat. No. 5,201,101 (Rouser et al.). These patents are hereby fully incorporated by reference herein.

Other methods of fabrication of microstructures known in the art may also be used. The photo etching methods described in U.S. Pat. No. 5,815,306 to Sheridon, for example, may be used to fabricate the microstructures of pockets and posts disclosed in the present invention. There are, however, essential differences between the gyricon display in Sheridon patent and display in the present invention. The gyricon display in Sheridon is a transmissive display while the display in the present invention is a reflective type. Due to its transmissive mode of function, the display in Sheridon requires a pre-formed array of fly's-eye lenses and further requires that the subsequently fabricated microstructure have an array of holes strictly registered or indexed with the fly's-eye lens array. Such micro indexing requirement makes it difficult or impossible to use the molding method described previously in this application. Whereas in the present invention, no indexing is required and as a result both molding method and photo etching methods may be used, with the former being a preferred method.

Furthermore, and also due to its transmissive mode of function, the display in Sheridon requires that the holes formed on substrate be through from the top of the substrate to the bottom of the substrate, and that after such holes have been formed the substrate be covered or closed from both sides (the top and the bottom) using transparent films, otherwise the bottoms of the holes will be formed from the non-transparent substrate itself, making transmission of light impossible. By contrast, since the present invention functions in a reflective mode, the cavities 160 do not need to be such through holes as in the structure in the Sheridon patent '306. Instead, when the cavities 160 are formed from the process of molding, the bottom portion of the substrate material naturally and integrally forms bottoms for the cavities 160. These bottoms need not be removed to facilitate transmitting the light. Nor is further closing from the bottom side needed.

Furthermore, since there is no requirement of indexing between a fly's-lens array and the array of holes, even if a photo etching method rather than the preferred molding method is used to fabricate the microstructure of the present invention, the process of the fabrication is much less restricted than that is in the Sheridon patent. In the Sheridon patent '306, the requirement of indexing mandates that the necessary photo mask be formed by using a given fly's lens array, which is often available in limited and fixed patterns. Whereas in the present invention, the shape of the photo mask may be designed in accordance with the desired geometric shapes of the pockets and posts.

Once the substrate containing the microstructures of pocket and/or posts is made, particles can be placed in the microstructures. Placing bichromal particles into a microstructure is a straightforward process in which the particles are spread or coated over the substrate and fall in a nearby receiving position such as a pocket or a cavity deformed by several posts therearound. To expedite the process, the substrate can be gently vibrated. In the case where the substrate is designed to contain a monolayer of particles only, the process is particularly simple because once a receiving position is filled, no additional particles can enter it.

When the display uses multiple color, such as trichromal color, or four quadrant colored type of particles, the placement of particles in the microstructure is more complicated. In these displays, there are more than one type of particles involved and each type of the particles must be placed in a designated subset of receiving positions in a controlled manner. A method of placing multiple color particles is disclosed in U.S. Pat. No. 5,777,782 to Sheridon which patent is fully incorporated by reference.

Once the particles are properly placed in the microstructure, the substrate containing particles may be covered and subsequently sealed from above using a transparent film containing the addressable electrodes. Conventional methods for making addressable electrodes maybe used. Alternatively, addressable electrode film may be made in accordance with an improved method disclosed in a commonly-owned patent application titled "Micro Structured Segmented Electrode Film For Electronic Displays" (Attorney Docket #M507.12-15), which application is fully incorporated by reference. Additionally, contrast of a display may be further improved using structures disclosed in the commonly-owned U.S. patent applications titled "Microstructures with Assisting Optical Elements to Enhance an Optical Effect" and "Microstructures with Assisting Optical Lenses" and filed concurrently (Attorney Docket Numbers M507.12-16 and M507.12-17 respectively), which applications are fully incorporated by reference.

The gyricon display is now mostly complete. Further treatment of the display may still be done at this point. For example, a method for improving the respondability of gyricon particles and contrast of an addressable gyricon display is disclosed in a commonly-owned patent application titled "Method of Improving the Responsibility of Movable Structures in a Display" (Attorney Docket #M507.12-13), which application is fully incorporated by reference.

Although the present invention has been described with reference to preferred embodiments, workers skilled in the art will recognize that changes may be made in form and detail without departing from the spirt and scope of the invention.

What is claimed is:

1. A microstructure to interact with electromagnetic waves, comprising:
   a microfabricated substrate comprising a base portion and a two-dimensional array of pockets on the base portion, each pocket having a sidewall, the sidewall having an inner side defining a cavity, the cavity having a bottom from which the inner side extends to a uniform height and a top opposing the bottom, the bottom being fluidly sealed, the inner side not enclosed at the top of the cavity but leaving an opening suitable for placing particles in each pocket from above, the bottom of the pockets being integral with the sidewall of the pockets;
   a plurality of optically anisotropic particles placed in the pockets from above, the placement of the particles resulting in a layer of the particles with at least two particles in each of substantially all pockets, and when so placed, the particles being rotatable; and
   a cover layer transparent to an electromagnetic wave laid across the two-dimensional array of pockets to seal the particles within the cavities, wherein:
   the microstructure is a visual display apparatus;
   the pockets are positioned close to each other and each pocket shares boundaries with other pockets adjacent to it, the geometric shape of the shared boundaries and the geometric shape of the inner side of each pocket being optimized to conform a closely packed pattern of the particles placed within the pockets; and
   the bottom of each pocket is contoured, forming a plurality of recesses, each recess receding from a substantially uniform recess height, the recess height being lower than the sidewall of the pocket, each recess being suitable for positioning one particle without substantially interfering the other particles positioned on the adjacent recesses.

2. The microstructure according to claim 1, wherein the optically anisotropic particles are anisotropic pertaining to a visible light and the structure is a visual display.

3. The microstructure according to claim 1, wherein the pockets are integrally pre-formed with the base portion before the particles are disposed in the pockets.

4. The microstructure according to claim 1, wherein:
   the particles are of substantially uniform size and when disposed in the pockets, the particles are entirely below the height of the sidewall of the pocket in which the particles are disposed, the sidewall of each pocket having an upper perimeter edge, the upper perimeter edge contacting the cover layer, and when so contacted, the upper perimeter edge and the cover layer forming an individual enclosure over each pocket.

5. The microstructure according to claim 4, wherein:
   the pockets are positioned close to each other and each pocket shares boundaries with other pockets adjacent to it, the geometric shape of the shared boundaries and the geometric shape of the inner side of each pocket being optimized to conform a closely packed pattern of the particles placed within the pockets.

6. The microstructure according to claim 1, wherein the bottom of each pocket is rounded.

7. The microstructure according to claim 1, wherein the inner side of each pocket is slightly tapered.

8. The microstructure according to claim 4, wherein pockets contain dielectric fluid, the dielectric fluid being sealed in each pocket individually with substantially no leakage or filtration thereof from the pocket.

9. The microstructure according to claim 1, further comprising:
   a filling material positioned around or above the particles but below the cover layer, wherein the filling material is a thixotropic dielectric fluid.

10. The microstructure according to claim 9, wherein the filling material exerts a force on the particles so that the particles are bistable, the force being subject to change in response to a factor selected from the group of voltage, vibration and heat.

11. The microstructure according to claim 9, wherein the filling material has a viscosity sufficient to keep the particles bistable through the contact with the particles.

12. The microstructure according to claim 1, further comprising:
   a filling material, wherein the filling material is positioned around or above the particles but below the cover layer and is in contact with the particles.

13. The microstructure according to claim 12, wherein the filling material is a dielectric fluid.

14. The visual display apparatus according to claim 1, wherein each recess has a recess bottom which is shaped to conform the geometric shape of a particle.

15. The visual display apparatus according to claim 1, wherein the particles are spheroid balls and the recess bottoms are rounded.

16. The visual display apparatus according to claim 1, wherein:
   each pocket is capable of containing at least three particles, the particles in each pocket forming interstices among the adjacent particles, a substantial number of the interstices being filled with a post, each post extending from the bottom of the pocket to a post height, the post height being not higher than the sidewall of the pocket, and the posts substantially causing no interference with the rotation of the surrounding particles.

17. The visual display apparatus according to claim 16, wherein the shape of each post being conformingly fitting at least a lower portion of the interstice.

18. The visual display apparatus according to claim 16, wherein at least some of the posts have a full post height which is substantially the same as the height of the sidewall of the pockets.

19. The visual display apparatus according to claim 16, wherein substantially all the interstices except the ones adjacent to the inner side of the pockets are filled with posts.

20. The visual display apparatus according to claim 16, wherein the posts are integrally pre-formed with the pockets.

21. The visual display apparatus according to claim 16, wherein the particles are optically anisotropic rotary balls, and each post is a convex, rounded triangular structure, the balls forming a two-dimensional hexagonal close packed array, the structure of the posts conformingly fitting the space between the balls.

22. The visual display apparatus according to claim 1, further comprising a filling material, wherein the filling material is positioned above the particles but below the cover layer and is in contact with the particles so that the particles are bistable.

23. The microstructure according to claim 1, further comprising:
  a two-dimensional array of posts on the base portion, the base portion having an upper side from which each post extends substantially vertically to a post height, the posts being substantially discrete from each other and being spaced, wherein:
    the layer of the particles has a thickness, the particles are so placed such that each post is substantially surrounded by particles, and the cover layer is laid across the two-dimensional array of posts in a substantially parallel spaced relation with the upper side of the base portion of the substrate, the cover layer having a lower side facing the upper side of the base portion, defining a distance from the upper side of the base portion to the lower side of the cover layer, the distance being equal to or greater than the greatest post height, and the distance being at least equal to or greater than the thickness of the particle layer.

24. The microstructure according to claim 23, wherein the posts are integrally pre-formed with the base portion before the particles are disposed in the substrate.

25. The microstructure according to claim 23, wherein the thickness of the particle layer is greater than the height of the posts.

26. The microstructure according to claim 25, wherein the height of the posts is substantially lower than the thickness of the particle layer.

27. The microstructure according to claim 23, wherein the height of at least one post is greater than the thickness of the particle layer, at least one such post contacting the lower side of the cover layer.

28. The microstructure according to claim 23, wherein:
  the particles are divided into groups by a network of sidewalls extending from the base portion, substantially all sidewalls contacting the lower side of the cover layer, the network of the sidewalls forming a two-dimensional array of pockets, each pocket containing a group of particles, each group comprising at least three particles.

29. The microstructure according to claim 28, wherein the two-dimensional array of pockets has a randomized pattern.

30. A method of making a structure to interact with electromagnetic waves, the method comprising:
  making a substrate, the substrate having a contoured surface defining a plurality of cavities having top openings, the cavities being integral with the substrate, each cavity having a sidewall, a bottom, and a top opposing the bottom, the bottom being fluidly sealed, the cavities are not enclosed at the top but leaving an opening suitable for placing particles in the cavity from above, wherein the substrate is made using any of the following micromanufacturing method: photo lithography, compressing molding and injection molding, or a combination thereof;

placing a plurality of optically anisotropic particles in the cavities, the placement of the particles resulting in at least a layer of the particles across the surface of the substrate, each of substantially all cavities containing at least two particles, and when placed in the cavities, the particles being selectively rotatable;

placing a cover layer transparent to an electromagnetic wave across the particle laden substrate; and contouring the bottom of each cavity to define a plurality of recesses, each recess having a substantially uniform depth, the depth being defined by a support side, the support side being shorter than the sidewall of the cavity, each recess being suitable for positioning one particle without substantially interfering the other particles positioned in the adjacent recesses.

31. The method of claim 30, wherein the optically anisotropic particles are anisotropic pertaining to a visible light and the structure is a visual display.

32. The method according to claim 30, further comprising:
  placing a filling material into cavities directly through the top openings of the cavities.

33. The method according to claim 32, wherein the filling material is a dielectric fluid.

34. The method according to claim 33, wherein the filling material exerts a force on the particles so that the particles are bistable.

35. The method according to claim 34, wherein the force is subject to change in response to a factor selected from the group of voltage, vibration and heat.

36. The method according to claim 30, wherein each cavity contains at least two particles, the particles in the cavities are closely packed.

37. The method according to claim 30, wherein the support side of each cavity comprising a contiguous side wall.

38. The method according to claim 30, wherein the support side of each cavity comprising a plurality of discrete posts.

39. The method according to claim 30, wherein:
  the contoured surface of the substrate having an upper contour surface defined by the highest points on the contoured surface, the layer of the particles having an upper side, the upper side of the particle layer being lower than the upper contour surface of the substrate, and the cover layer being connected to the substrate by contacting the upper contour surface of the substrate and fixing the contact using an adhesive.

40. The method of manufacture of claim 30, wherein the method further comprises:
  dividing each cavity into a plurality of sub-cavities of substantially uniform size and shape using posts, each sub-cavity being suitable for positioning one particle without substantially interfering the other particles positioned in the adjacent sub-cavities.

* * * * *